Sept. 22, 1936.　　C. O. CHRISTIANSON　　2,055,214
LIQUID DISPENSER
Filed Aug. 8, 1935　　6 Sheets-Sheet 1

Inventor
C.O.Christianson.
Hiram A. Sturges　Attorney

Sept. 22, 1936.  C. O. CHRISTIANSON  2,055,214
LIQUID DISPENSER
Filed Aug. 8, 1935  6 Sheets-Sheet 2

Inventor
By C. O. Christianson.
Hiram H. Sturges  Attorney

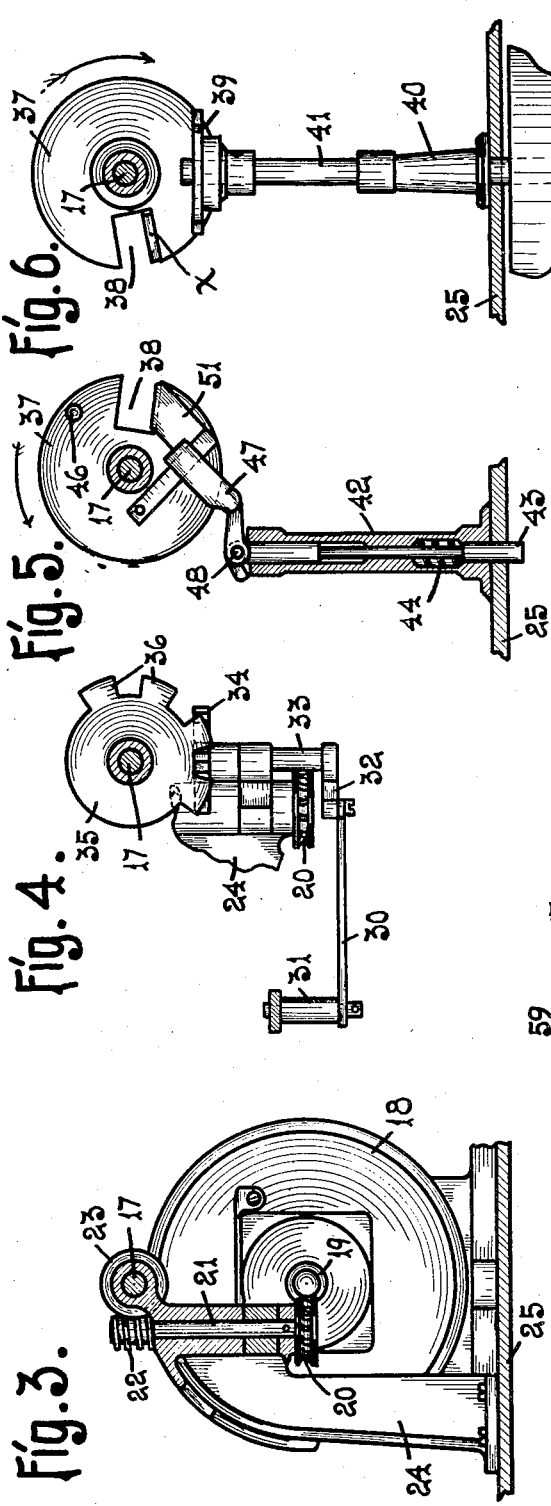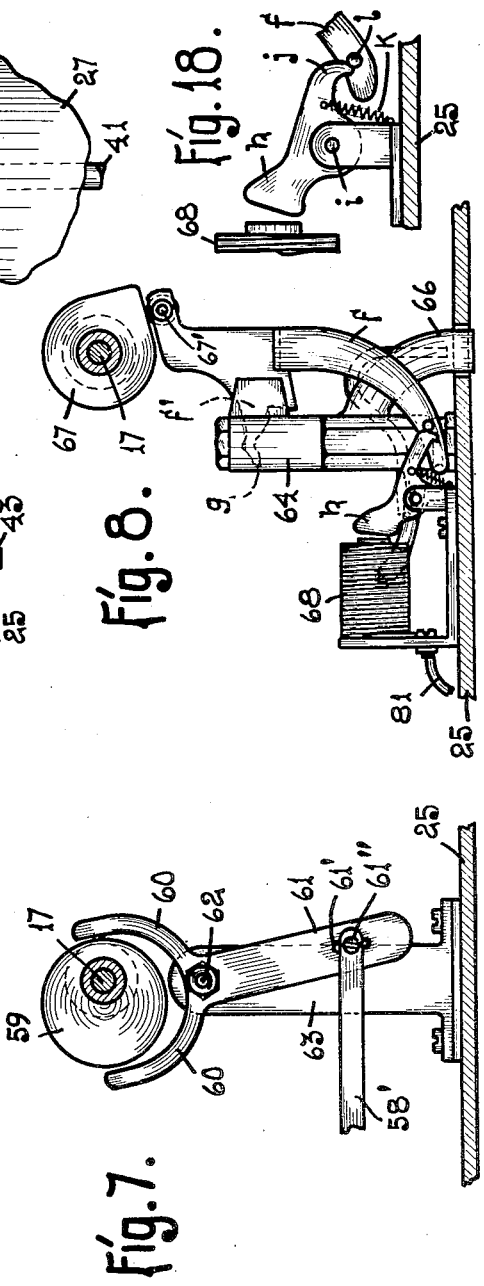

Sept. 22, 1936.   C. O. CHRISTIANSON   2,055,214
LIQUID DISPENSER
Filed Aug. 8, 1935   6 Sheets-Sheet 4

Inventor
By C. O. Christianson.
Hiram A. Sturges   Attorney

Sept. 22, 1936.    C. O. CHRISTIANSON    2,055,214
LIQUID DISPENSER
Filed Aug. 8, 1935    6 Sheets-Sheet 5
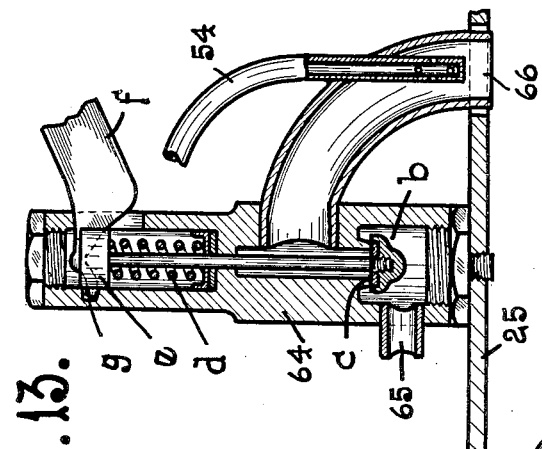
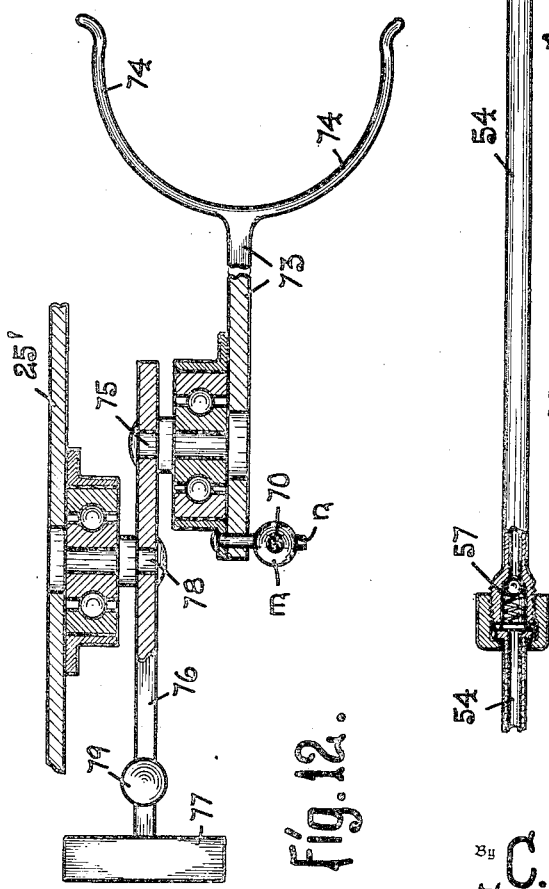
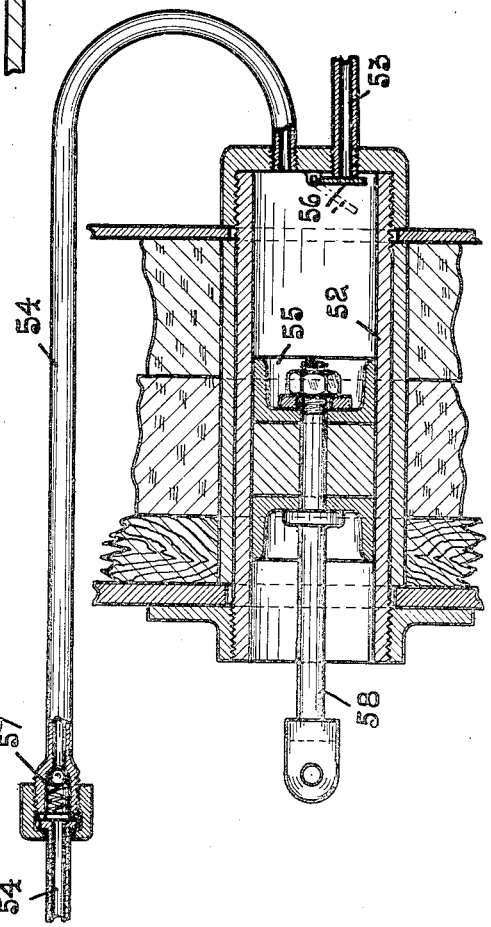
Inventor
C. O. Christianson
Hiram A. Sturges  Attorney Sept. 22, 1936.  C. O. CHRISTIANSON  2,055,214
LIQUID DISPENSER
Filed Aug. 8, 1935  6 Sheets-Sheet 6
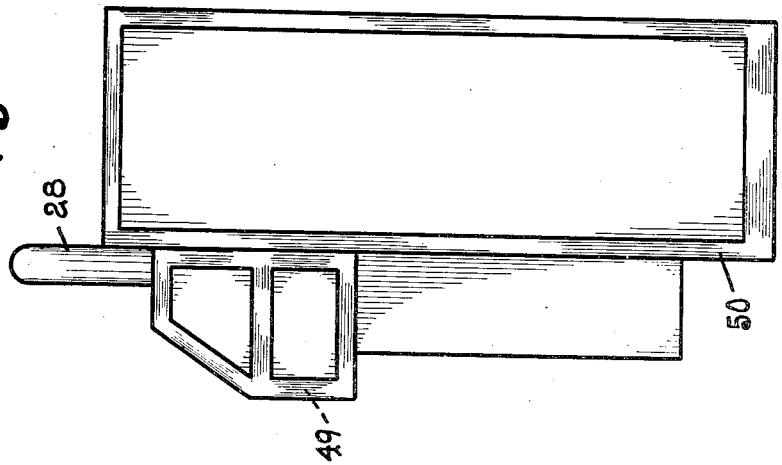
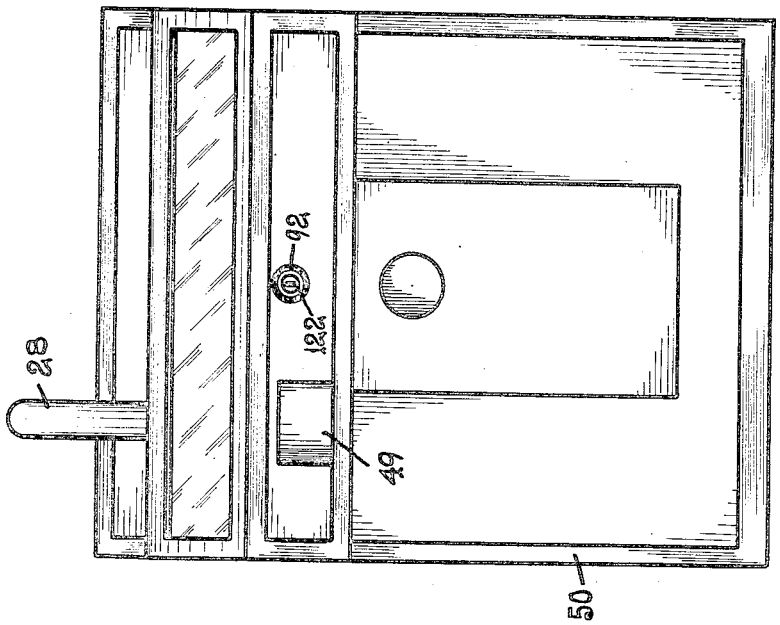
Inventor
By C. O. Christianson
Hiram A. Sturges Attorney Patented Sept. 22, 1936

2,055,214

UNITED STATES PATENT OFFICE

2,055,214

LIQUID DISPENSER

Carl O. Christianson, Shenandoah, Iowa, assignor to Nickel-Matic Soda Fountain Company, Shenandoah, Iowa Application August 8, 1935, Serial No. 35,317

8 Claims. (Cl. 225—21)

This invention relates to a liquid dispenser, and more specifically to a dispenser for a beverage consisting of a syrup mixed with carbonated water.

The liquid dispenser to be described is of that class operating automatically upon insertion of a coin. The dispenser is arranged to be installed in public places and is adapted to operate at an unusual degree of speed in delivering cups containing the mixed liquids to purchasers, the movable mechanism for operation, for the most part, being exposed to view. While the invention discloses a new and useful coin-control for the operating-mechanism, no claim is made at this time for the same, and no claim is made for the vertical cylindrical container for the nested cups and the means for supporting the cups therein and releasing them, believed to be old in the art.

The present invention includes new and useful means for moving the beverage cups after they have been released from the cylindrical container above mentioned, also for mixing the liquids, delivering the mixed liquids to the cups, weighing the liquids and delivering the beverage to the purchaser. Other objects of the invention will appear in the description herein, in connection with the drawings and appended claims, it being understood that the drawings illustrate only one embodiment of the invention, and that changes may be made in form, size and proportions, said changes being within the scope of the invention as claimed.

In the drawings, Fig. 1 is a front view of the operating parts of the dispenser, and Fig. 2 is a plan view of the same. The remaining figures relate to details of construction.

Fig. 3 is a vertical section on line 3—3 of Fig. 1, showing parts for rotating the horizontal operating shaft by use of an electric motor.

Fig. 4 is a section on line 4—4 of Fig. 1, showing parts movable by the operating shaft for releasing the cups from the vertical cylindrical container or cup-holder.

Fig. 5 is a vertical section on line 5—5 of Fig. 1, showing a cam and parts for controlling the revolving movements of a cup-carrier, and Fig. 6 is a view showing the reverse side of the cam shown in Fig. 5 and means for controlling the movements of the cup-carrier.

Fig. 7 is a section on line 7—7 of Fig. 1, showing means for operating the syrup-pump shown in Fig. 14.

Fig. 8 is a vertical section on line 8—8 of Fig. 1, illustrating mechanism for a control of carbonated water under control of a valve shown in Fig. 13.

Fig. 12 is a plan view, partly in section, showing a weight and a cup-supporting-fork used when weighing the mixed liquids, being a detail relating to Fig. 10.

Fig. 13 is a sectional view showing means for a control of carbonated water, being a detail relating to Fig. 8.

Fig. 14 is a plan view, partly in section showing a pump for a movement of syrup for the beverage, the power for moving the syrup being shown in Fig. 7.

Fig. 15 is a front view of a casing for containing water-cooling devices together with beverage-material and an electric battery.

Figure 1:
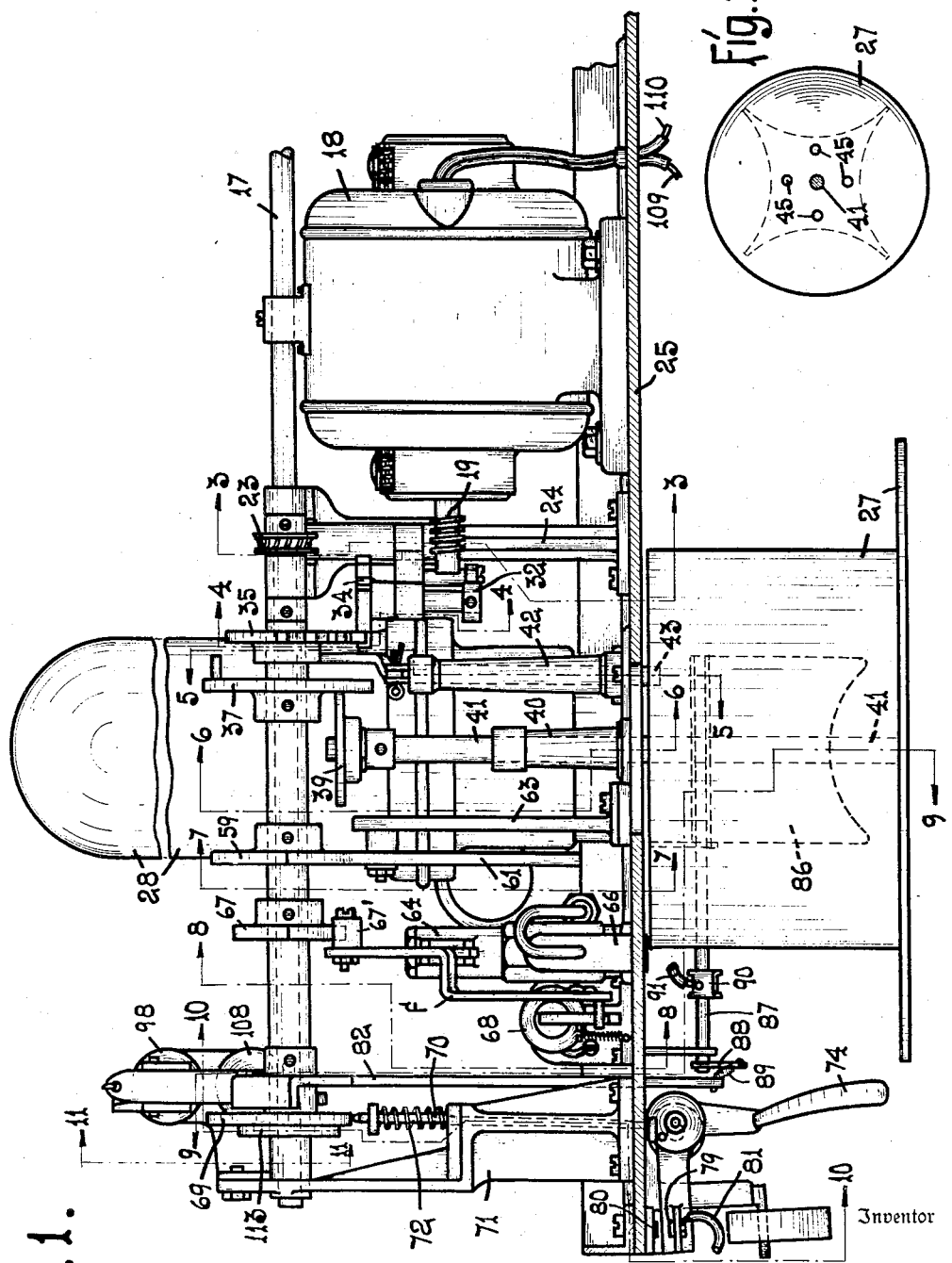

Fig. 16 is an end view of the casing. Fig. 17 is a view showing the top of a turntable or cup-carrier. Fig. 18 is a detail relating to Fig. 8.

Referring now to the drawings for a more particular description, numeral 17 indicates a horizontal operating shaft rotatable by an electric motor 18 actuated by any suitable source of electrical supply, the shaft of the motor being provided with a worm gear 19 engaging a gear wheel 20 of a vertical shaft 21 (Fig. 3) having a terminal worm gear 22 in engagement with a gear 23 which is mounted on said operating shaft.

As best shown in Fig. 3, the vertical shaft 21 and its worm gears are suitably supported by a curved brace-bar 24 which is mounted on the base-plate 25 of the apparatus.

The beverage to be dispensed consists of a mixture of carbonated water and syrup, the latter being any suitable liquid-concentrate pleasing to the taste and conducive to the health of the individual, said beverage being delivered in conventional cups 26 delivered to the purchaser on a cup-carrier 27 (Figs. 1-9).

Numeral 28 indicates a vertical cylindrical container or cup-holder in which the cups are nested in compact form, one within another.

Figure 2:
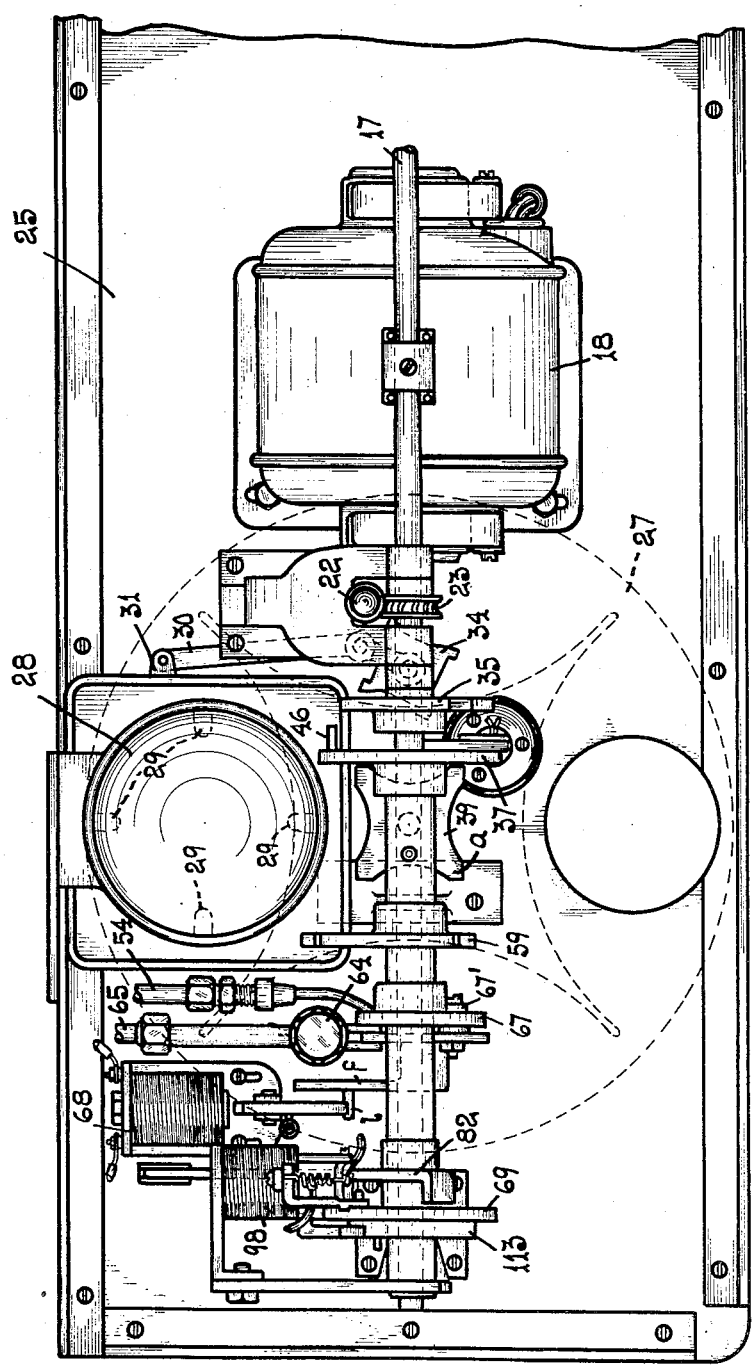

It will be understood that mechanism has been invented and used for detaching the nested cups, singly, to permit them to fall to the bottom of the container 28, and since this mechanism is well known, a description thereof is not considered necessary except to state that a part thereof consists of horizontally movable lugs 29 shown in dotted lines in Fig. 2 of the drawings, said lugs normally projecting into the sides of the container, but adapted to be moved coincidently and outwardly for releasing the cups.

For releasing these cups, one by one, a link 30 extends to a coupling 31 (Figs. 2–4), the latter being pivotally connected with the cup-releasing mechanism referred to, the operation being that a cup will be released at each forward movement of the link 30.

For the longitudinal reciprocation of the link 30 it is pivotally attached to a crank 32 having a vertical shaft 33 which is provided at its upper end with a gear wheel 34, a cam 35 being mounted on the shaft 17 provided with teeth 36 for engaging said gear wheel 34.

It should be explained that the operating shaft 17 has, comparatively, a slow rotatable movement and that the proportion of parts is such that the movements of the cups and cup-carrier 27 together with the control of valves, weighing of the beverage and other parts will be in consecutive order and at a suitable speed, the normal rotation for the shaft of the motor being reduced by the shaft 21 and the connections for its worm-gears, shown in Fig. 3, operating to materially reduce the speed of said shaft 17.

For delivering to the purchaser a cup of the beverage, the shaft 17 performs a complete rotation, and the crank 32 moves in a complete circle while the teeth 36 of the cam engage the gear wheel 34.

Means are provided for moving the cup-carrier 27 in an arc of 90 degrees for each operation and for locking and preventing any revoluble movement thereof except when it is in use.

The parts for this control of the carrier 27 consist, in part, of a cam 37 (Figs. 5-6) having a single recess 38 opening on its periphery, said recess being adapted to receive one of the corner-portions of a wheel 39 best shown in Fig. 2, said wheel 39 being approximately of rectangular form in plan.

Numeral 40 indicates a tubular standard secured to the base plate, and the vertical shaft 41 for the gear wheel 39 has bearings in said standard, said shaft 41 being disposed centrally of the cup-carrier, the latter being suitably secured to this shaft, and therefore the cup-carrier 27 will rotate whenever the shaft 41 rotates.

Disposed adjacent to the standard 40 is another tubular standard 42 in which is disposed a plunger or locking-bar 43, and a spring 44 (Fig. 5) is provided which presses said bar downwardly and normally causes its lower end to project below the base-plate 25.

By referring to Fig. 17 which shows the top of the cup-carrier, it will be seen that it is provided with holes 45, and means are provided for moving the plunger or locking-bar through these holes, in succession, for maintaining the cup-carrier stationary and for removing said bar from a hole to permit a movement of said cup-carrier.

One side of the cam 37 (Fig. 5) is provided near its periphery with a lug 46, and at 47 is indicated an arm disposed in the path of travel of said lug, said arm being pivotally mounted at 48 on the upper end of the bar 43, and when the lug engages the arm 47, by movement of the cam, its resulting downward swinging movement will cause an upward movement of the bar against the force of the spring 44, said arm being fulcrumed on the top of the standard 42, and the upward movement of the bar 44 removes it from a hole 45 to permit carrier 27 to swing on its axis.

It will be understood that the cup-carrier 27 remains stationary while the cup thereon is being filled with the beverage, and when the cup has been filled with a certain quantity of the beverage determined by weight, said carrier together with its cup thereon will be moved 90 degrees to the opening 49 (Fig. 15) at the front of the casing 50. Also during this movement of 90 degrees a cup on the platform of the carrier will be conducted from the cup-holder 28 to filling position.

Since the gear wheel 39 is disposed at right-angles to the cam 37 which is provided with the recess 38 for receiving a tooth or projection $a$ of said gear wheel, means are provided for causing said projection $a$ to enter said recess. For this purpose a spring 51, approximately of L-shape, is secured to one side of said cam, said spring having a terminal part extending at right-angles to the cam, through said recess, and providing a lip $x$ projecting outwardly of the opposite side of the cam, and in operation, while the cam moves in the direction shown in Figs. 5 and 6 its lip $x$ will engage in said recess and will cause the projection or tooth $a$ to be drawn into said recess for causing a rotatable movement of the shaft 41.

The movement last mentioned of the cam 37 will cause rotation of the gear-wheel 39, shaft 41 and the cup-carrier 27 of 90 degrees, the lower end of the plunger or locking-bar 43 being disposed in one of the holes 45 of the cup-carrier 27.

It will be noted that the lug 46 on the side of the cam 37 will engage the arm 47 for actuating the locking-bar 43 and causing a release of said bar from a hole 45 of the cup-carrier 27.

Means are provided for delivering syrup to each beverage-cup whenever required in a measured quantity or volume, said means consisting, in part, of a pump-cylinder 52 having an intake pipe 53 and discharge pipe 54, the piston for the cylinder being indicated at 55 and a valve 56 being provided for the intake pipe, and a check-valve 57 being provided for the discharge-pipe, the piston-rod being indicated at 58.

The piston 55 is reciprocated by means of an eccentric cam 59 mounted on the operating shaft 17 best shown in Fig. 7, said cam being engaged at its periphery by a pair of opposed prongs 60 of a rock-arm 61 which is pivotally mounted at 62 on a standard 63, and these parts are of such proportions that the amount of syrup pumped will be uniform at each rotation of the cam 59.

As shown in Fig. 7, the rock-arm 61 is provided with a slot 61', said slot being adapted to receive a pin 61'' for a mounting thereon of link 58' which is connected with the piston rod 58, to permit adjustment of the piston 55.

As shown in Fig. 13, a valve housing 64 is provided with an intake pipe 65 for carbonated water, a valve $b$ being normally pressed to its seat $c$ by a spring $d$, said spring being mounted on the valve stem and engaging the head $e$ of the valve stem.

The valve $b$ is moved from its seat by a swingable arm $f$, said arm, between its ends, having a projection $f'$ pivotally mounted at $g$ on the valve housing 64 near the top thereof. The lower end of the arm $f$ is indicated at L and has the form of a lip, and operated as a latch.

The head $e$ of the valve stem of valve $b$ is suitably cut away to provide a recess (not shown)

for receiving the projection $f'$, and since this projection is fulcrumed on this head $e$ it is obvious that a downward rocking movement of the arm $f$ will move the valve $b$ from its seat $c$ to permit the carbonized water to move into the valve housing 64 and to be discharged therefrom through the beverage delivery pipe 66.

The rocking movement for the arm $f$ is caused by the cam 67, this cam being approximately of pear-shape and engaging the roller 67' on the arm $f$, and during each rotation of the shaft 17 the valve $b$ will be actuated for a movement of the carbonated water to the discharge pipe 66.

Numeral 68 (Figs. 8–18) indicates an electromagnet, the use of which will presently be described. The armature for this electromagnet is indicated at $h$, said armature being pivotally mounted between its ends as indicated at $i$ and having a curved end-portion or hook $j$ operating as a latch or lock. The armature $h$ is under control of a spring $k$ which normally maintains the armature in non-contact with the electromagnet.

The lower end of the arm $f$ is provided with a lip L, and when the cam 67 moves the arm $f$ as mentioned, the lower end of said arm will move toward the armature and its end or lip L will slide under the hook $j$ of the armature $h$ and this will maintain said armature in disengagement with the electromagnet 68, the valve $b$ thereby being prevented from moving to its seat and permitting the carbonized water to flow through the discharge pipe 66.

It will be understood that when the electromagnet is electrically energized the armature, by its movement to the electromagnet, will cause the end or lip L of the arm $f$ to be released from the armature, and by action of the spring $d$ the valve $b$ will move to its seat to terminate the flow of the carbonized liquid.

Means are provided for lifting the cup from the cup-carrier 27 to permit the two liquids to enter said cup from the discharge pipe 66 together with means for weighing the liquids in the cup and lowering the cup and its contents to said carrier 27, and to terminate the flow as soon as the cup has been correctly filled, the operating parts for these purposes being located, for the most part below the base plate 25.

Numeral 69 indicates an eccentrically formed cam which is mounted on the shaft 17 used for moving the cup upwardly and downwardly relative to the cup-carrier 27. The periphery of this cam is engaged by the upper end of a vertical reciprocating plunger-rod 70 having bearings in a bracket 71 and pressed into contact with the cam by a spring 72.

Numeral 73 indicates a link provided at one of its ends with a pair of prongs 74 for engaging the opposed sides of a cup, said link being provided between its ends with a pivot 75 having a mounting in the short end of a balancing-bar 76 provided at its free end with a weight-member 77 and pivoted at 78, said last named pivot being carried by a support 25', or part of the base-frame 25.

The normal position of the link 73 and prongs 74 is approximately vertical as shown in Fig. 1 and they are adapted to be reciprocated in an arc of 90 degrees for lifting the cup from the cup-carrier 27 and lowering the cup to said cup-carrier after its contents have been weighed.

It will be understood that these last named movements are caused, in part, by the form of the cam 67 which causes the plunger 70 to move downwardly for moving the short end of the link 73 downwardly, the fork or prongs 74 moving upwardly, the lower end of the plunger 70 being provided with a head $m$ which is mounted on the pivot pin $n$ provided for the short end of the link 73.

When the end of the plunger 70 engages a certain part of the periphery of the cam 69 of greater radial distance from the shaft 17 the prongs 74 and long arm of the link 73 will swing upwardly to cause the cup to be elevated from the cup-carrier 27 to be filled and weighed.

The cups used are of tapered conventional form and are provided with an annular ridge at their open end, and during the upward swinging movement mentioned the prongs engage the sides and lift the cup, the arc of movement of link 70 being such that the prongs do not engage the carrier 27 upon which the cups are supported. When the end of the plunger 70 engages peripheral parts of lesser projection of the cam 69 the cup and its contents will be lowered to the carrier 27, the downward movement of the filled cup to said carrier being gradual and without appreciable vibration.

The flow of the two liquids to a cup, already described, will continue until a specific quantity thereof in weight is delivered to the cup, at which time the flow will cease.

The flow of the syrup to the cup is a measured volume, said volume, of course, depending upon the cubical contents of the pump-cylinder 52.

Since carbonated water cannot be accurately measured automatically by volume the arrangement is such that the downward pressure of the plunger 70 for lifting the prongs and cup and maintaining the latter in its elevated position while the liquids flow therein, will be supported by the pivot 75, and therefore said downward pressure or weight will be directed to the short arm of the bar 76.

In operation the cup will remain in this elevated position until a sufficient quantity of liquid in weight, flows into the cup to equal the weight of the element 77, and at that instant the electromagnet 68 will be electrically energized for closing the valve $c$ (Fig. 13) which prevents any additional flow of carbonated water to the cup. The valve 57 (Fig. 14) for a control of the flow of syrup will also be instantly closed at that time, this being under control of the cam 59, as described.

While the prongs 74 and cup held therebetween move upwardly the balancing-bar 76 and weight 77 also swing upwardly until the electrical contact-piece 79 engages the electrical contact-piece 80 which is in electrical communication with the metallic base-plate 25 operating as an electrical conductor leading to one pole of an electric battery (not shown). The electrical contact-piece 79 is in electrical communication with the electromagnet 68 through the electrical conductor 81 (Fig. 8). The electromagnet 68 is in electrical communication with the opposite pole of said electrical battery.

The advantage in the use of the slot 61' for the rock-arm 61 shown in Fig. 7 of the drawings is to provide means for adjusting the length of stroke of piston 58 (Fig. 14) to permit a greater or lesser amount of the liquid-concentrate or syrup to enter the pump cylinder, the selected amount of syrup for each cupfull of beverage not interfering with correct weighing.

Means are provided for adjusting each cup to a correct position on the floor of the cup-carrier 27. It has been explained that the nested cups in the vertical cylinder 28 move downwardly to the cup-carrier 27, and in order that each cup will occupy a correct position on the floor of said carrier so that, after the carrier has moved in an arc of 90 degrees, said cup will be disposed directly beneath the beverage discharge port 66, certain mechanism is provided, and operated by the cam 69, best shown in Fig. 9, this being the same cam shown in Fig. 10 of the drawings.

Numeral 82 indicates a reciprocating control-arm provided with a slot 83 and contact-lug 84. The cam 69 is provided on one of its sides with a pin or lug 85, and during each rotation of the shaft 17 the pin 85 will engage and will cause an upward movement of said arm 82. Numeral 86 indicates an adjusting-plate which is secured to a horizontal shaft 87 (Fig. 1) having bearings in suitable brackets carried by the base-plate 25.

The end of the shaft 87 is provided with a crank-arm 88. Numeral 89 indicates a spring connected at its respective ends with the crank-arm 88 and the arm 82.

In operation when the arm 82 is moved for moving the cup to adjusted position on the floor of the cup-holder the adjusting-plate 96 will engage the cup. However if there is no cup on the cup-carrier to be moved or adjusted the plate 86 would, by operation of the arm 82, be swung in a greater arc and thereby would cause a closure of an electrical circuit consisting of a crank-arm 90, (which is attached to the shaft 87) said crank-arm 90 being provided with an electrical conductor 91. When the adjusting-plate 86 is moved in its greatest arc, the crank-arm 90 will engage the base-plate 25 which established the electrical circuit for a purpose later to be described.

Figure 11:
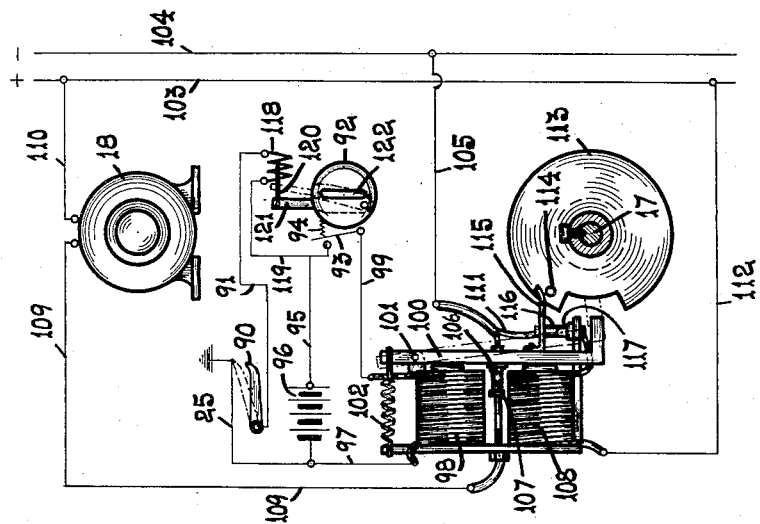
Fig. 11 is a diagrammatic view illustrating means for causing operation of an electric motor when a coin is deposited in a coin-holder.
Figure 10:
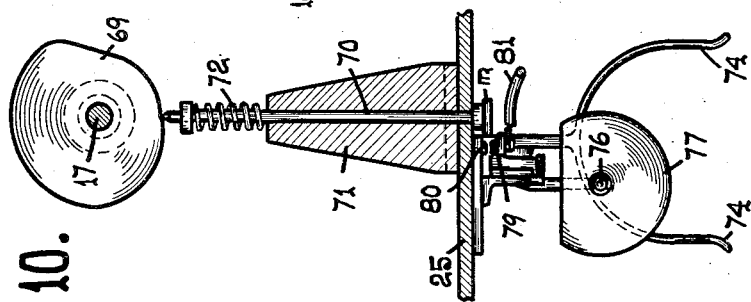
Fig. 10 is a vertical section on line 10—10 of Fig. 1, illustrating means for elevating a cup to permit filling and weighing its contents and for lowering the cup and its contents to the cup-carrier.
Figure 9:
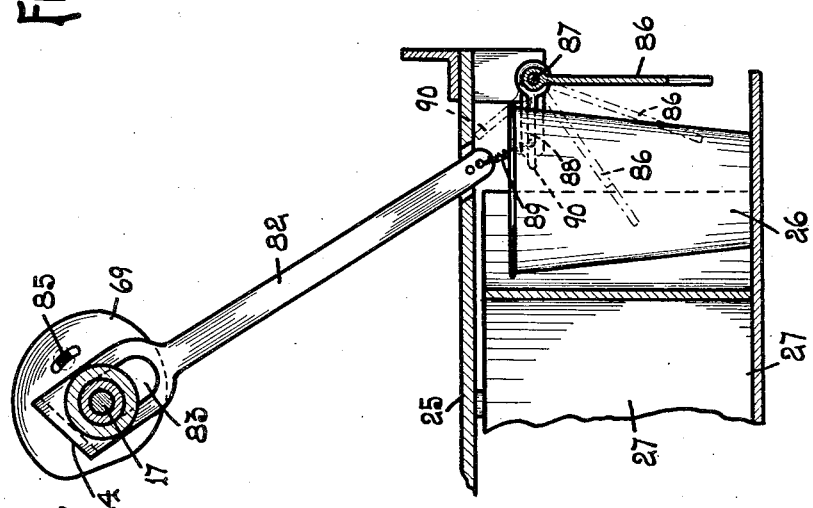
Fig. 9 is a vertical section on line 9—9 of Fig. 1, illustrating means for moving a cup horizontally to adjusted position after it has been released from the vertical cup-holder.

Referring to Fig. 11 numeral 92 indicates a slot in a metallic coin holder, and when a coin is inserted in the slot it will cause a closure of a switch 93, said switch being normally held open by a spring 94. A conductor 95 leads from the switch to an electric battery 96. A conductor 97 leads from the battery to a coil 98 of an electromagnet. An electrical conductor 99 leads from said coil 98 to the switch 93 to close the electrical circuit.

The electrical connections just described provide an electrical circuit of comparatively low voltage, so that no electrical shock will occur to a person while placing a coin in the coin-holder.

It will be understood that a closure of the switch 93 will cause the armature 100 to engage the electromagnet 98. The armature is pivoted at 101 and at 102 is a spring which normally resists engagement of said armature with the coil or armature 98 just mentioned. When this engagement or contact is made the said armature will close an electrical circuit which includes the conductors 103 and 104, the object in view for this last named electrical circuit being to provide a suitable voltage for the electric motor 18, a conductor 105 leading to the service wire 104 from a breaker-point 106 which is mounted on the armature 100, a stationary breaker-point 107 between the electromagnet 98 and a second electromagnet 108, an electrical conductor 109 leading from the breaker-point 107 to said motor 18, said motor having an electrical conductor 110 leading to the service wire 103, which closes the circuit for energizing said motor 18.

A further electrical circuit is employed in connection with the parts last described which consists of the electromagnet 108, and electrical conductors 111 and 112 which lead from the electromagnet 108 to the service wires 103 and 104. The purpose of this last named electrical circuit is to cause the armature 100 to engage the electromagnet 107 for maintaining the breaker-points 106 and 107 in electrical contact during the rotation of shaft 17 for a single operation.

The only reason for employing the two electrical circuits is for the reason that the circuit used in connection with coin-holder 92 will be broken directly after it has been established, and the electromagnet 108 together with the breaker-points 106 and 107 and parts connected therewith cause a continued flow of electrical current afterward for rotating the shaft 17.

To terminate rotation of the shaft 17, the electrical connection for the electromagnet 108 must be broken, and this is accomplished mechanically, by use of a cam 113 mounted on said shaft.

The cam 113 is provided with pins 114 which, after one rotation of the shaft has been completed, engages a spring 115 which is provided for the armature 100. This engagement causes the spring to become lifted for breaking the last named electrical circuit, and the spring 102 thereupon causes the armature 100 to move outwardly from the electromagnet 108 and thereby breaking the contact with each act of the breaker-points 106 and 107 and terminates operation of the motor 18.

Numeral 116 indicates a contact-piece provided for the spring and at 117 is indicated a contact-piece which is provided for the electromagnet 108, these contact-pieces normally being in engagement with each other by action of the spring 115, and when the pin 114 engages the contact-piece 115 of the spring and causes disengagement of said contact-pieces 116 and 117 for terminating operation of said motor 18.

The reason for employing the last described means for breaking the electrical connection leading to the electromagnet 108 is that said electromagnet carries less amperage than the circuit leading to the motor 18.

Relative to the control of the coin holder 92 to prevent deposit of a coin when no cups move to the cup-carrier from the cup-cylinder 28, said control, as heretofore stated, being in engagement of the crank-arm 90 of shaft 87 with the base-frame 25, it should be stated that while the base-plate 25 operates as an electrical conductor leading to the electrical battery 96 as shown in Fig. 11, the electrical conductor 91 carried by the crank-arm 90 leads to an electromagnet 118, an electrical conductor 119 leading from the electromagnet 118 to the electric battery 96.

At times when said electromagnet 118 is electrically energized an iron core 120 will be drawn into the electric coil 118.

At 121 is indicated a rock-lever adapted to be moved for closing the slot 122 of the coin-holder 92 to prevent deposit of a coin therein at any time when the supply of cups in the holder 28 is lacking.

The rock-lever 121 is pivotally connected with the end of the iron core, and when the iron core moves into the core the rock-lever 121 will obstruct the slot 122.

I claim as my invention:—

1. In a liquid dispenser, mechanism for moving a cup in a circle's arc from its support to receive a liquid and lowering it to its support when filled, devices movable to cause a flow of liquid to the cup, devices for weighing the cup and contents after said cup has been moved from its support, and devices for terminating the flow of liquid to the cup.

2. In a liquid dispenser, mechanism for moving a cup in a circle's arc to receive liquids, mechanism for elevating the cup to filling position and lowering it when filled, devices arranged to cause a liquid to flow to the cup, devices arranged to cause a second liquid of measured volume to flow to said cup, devices for weighing said cup and its contents while in elevated position, and devices for terminating the flow of the first named liquid.

3. In a liquid dispenser, lifting mechanism movable for elevating a cup to receive liquids therein to be weighed, valve-controlling devices movable to cause a liquid to flow into the cup, secondary valve-controlling devices for moving a second liquid of specific volume into said cup, weighing devices arranged to coact with the first named valve-controlling devices and movable by the lifting mechanism for terminating the flow of the first named liquid to said cup.

4. In a liquid dispenser, lifting mechanism movable for elevating a cup to receive liquids therein to be weighed, valve-controlling devices including an electromagnet operable to cause a liquid to flow into the cup, secondary valve-controlling devices for moving a second liquid of specific volume into said cup, a normally open electrical circuit including said electromagnet, and weighing devices movable by the lifting mechanism for closing the electrical circuit to terminate the flow of the first named liquid to said cup.

5. In a liquid dispenser, lifting mechanism movable for elevating a cup to receive liquids therein to be weighed, valve-controlling devices movable to cause a liquid to flow into the cup, secondary valve-controlling devices for moving a second liquid into said cup, weighing devices arranged to coact with the first named valve-controlling devices and movable by the lifting mechanism for terminating the flow of the first named liquid to the cup, and means on the secondary valve-controlling devices adapted to be adjusted to cause a greater or lesser quantity of the second liquid to flow to said cup.

6. In a liquid dispenser, lifting mechanism movable for elevating a cup to receive liquids therein to be weighed, valve-controlling devices including an electromagnet operable to cause a liquid to flow into the cup, secondary valve-controlling devices for moving a second liquid into said cup, a normally open electrical circuit including said electromagnet, weighing devices movable by the lifting mechanism for closing the electrical circuit to terminate the flow of the first named liquid to the cup, and means on the secondary valve-controlling devices adapted to be adjusted to cause a greater or lesser quantity of the second liquid to flow to said cup.

7. In a liquid dispenser, a horizontal base-plate provided with a discharge-pipe, a cup-carrier movable horizontally, at intervals, in arcs of a circle below the base-plate, lifting mechanism movable for moving a cup from said carrier into engagement with the base-plate to receive liquids to be weighed, valve-controlling devices movable to cause a liquid to flow into the cup from said discharge-pipe, secondary valve-controlling devices for moving a second liquid of specific volume into said cup from said discharge-pipe, and weighing devices arranged to coact with the first named valve-controlling devices and movable by the lifting mechanism for terminating the flow of the first named liquid to said cup.

8. In a liquid dispenser, a horizontal base-plate provided with a discharge-pipe, a cup-carrier movable horizontally intermittently in circle's arcs below the base-plate, lifting mechanism movable for moving a cup from said carrier into engagement with the base-plate to be filled with liquid, valve-controlling devices movable to cause liquid to flow into the cup from said discharge-pipe, and weighing devices arranged to coact with the valve-controlling devices and movable with the lifting mechanism for terminating the flow of liquid to said cup.

CARL O. CHRISTIANSON.